(12) United States Patent
Droz et al.

(10) Patent No.: US 10,452,027 B2
(45) Date of Patent: Oct. 22, 2019

(54) SHOCK-ABSORBER DEVICE, IN PARTICULAR FOR A MICROMECHANICAL CLOCKWORK COMPONENT

(71) Applicant: CSEM Centre Suisse d'Electronique et de Microtechnique SA-Recherche et Développement, Neuchâtel (CH)

(72) Inventors: Serge Droz, Bôle (CH); Grégory Musy, Cortaillod (CH); Emmanuel Dominé, Peseux (CH); François Barrot, Erlach (CH)

(73) Assignee: CSEM CENTRE SUISSE D'ELECTRONIQUE ET DE MICROTECHNIQUE SA—RECHERCHE ET DÉVELOPPEMENT, Neuchâtel (CH)

( * ) Notice: Subject to any disclaimer, the term of this patent is extended or adjusted under 35 U.S.C. 154(b) by 0 days.

(21) Appl. No.: 15/088,510

(22) Filed: Apr. 1, 2016

(65) Prior Publication Data
US 2016/0291548 A1    Oct. 6, 2016

(30) Foreign Application Priority Data

Apr. 2, 2015    (EP) ..................... 15248005

(51) Int. Cl.
*G04B 37/05*    (2006.01)
*G04B 31/02*    (2006.01)
(Continued)

(52) U.S. Cl.
CPC ........ *G04B 37/055* (2013.01); *B29C 35/0805* (2013.01); *B29C 39/10* (2013.01);
(Continued)

(58) Field of Classification Search
CPC .. G04B 31/02; G04B 37/055; G04B 37/0418; F16F 9/00; F16F 13/04; F16F 15/022;
(Continued)

(56) References Cited

U.S. PATENT DOCUMENTS 3,087,568 A * 4/1963 Kurtze ..................... E04B 1/86
181/290
5,063,098 A * 11/1991 Niwa ..................... B32B 15/06
428/421

(Continued)

FOREIGN PATENT DOCUMENTS

CH    700 496 B1    9/2010
CH    701 594 A2    1/2011
(Continued)

OTHER PUBLICATIONS www.quantumcomposites.com/pdf/papers/Viper-SPE-Paper.pdf, Nov. 2014, retrieved from the internet May 29, 2018.*
(Continued)

*Primary Examiner* — Edwin A. Leon
*Assistant Examiner* — Jason M Collins
(74) *Attorney, Agent, or Firm* — Christensen O'Connor Johnson Kindness PLLC

(57) ABSTRACT

A shock-absorber and/or vibration-absorber device is proposed, comprising at least one flexible element able to deform under the effect of a stress; said device being remarkable in that it includes at least one so-called dissipative layer made from a material having a shear modulus lower than the shear modulus of the flexible element, a shock-absorbing factor greater than the shock-absorbing factor of said flexible element, and at least partially secured to said flexible element such that a flexion of the flexible element, under the effect of a stress, provides shearing of the dissipative layer making it possible to dissipate at least part of the energy from said stress. A method for manufacturing said shock-absorber device is also disclosed.

14 Claims, 3 Drawing Sheets

(51) Int. Cl.
*G04B 37/04* (2006.01)
*B29C 35/08* (2006.01)
*B29C 39/10* (2006.01)
*B29C 65/48* (2006.01)
*F16F 13/04* (2006.01)
*F16F 15/02* (2006.01)
*F16F 9/30* (2006.01)
*B29L 31/00* (2006.01)

(52) U.S. Cl.
CPC ............ *B29C 65/48* (2013.01); *F16F 9/306* (2013.01); *F16F 13/04* (2013.01); *F16F 15/022* (2013.01); *G04B 31/02* (2013.01); *G04B 37/0418* (2013.01); *B29C 2035/0827* (2013.01); *B29L 2031/721* (2013.01)

(58) Field of Classification Search
CPC .. B29C 39/10; B29C 2035/0827; B29C 65/48
See application file for complete search history.

(56) References Cited

U.S. PATENT DOCUMENTS

| | | | | |
|---|---|---|---|---|
| 5,087,491 | A * | 2/1992 | Barrett | B32B 7/02 248/560 |
| 5,842,686 | A * | 12/1998 | Hansen | F16F 9/306 188/73.37 |
| 5,895,013 | A * | 4/1999 | Towfiq | B64C 1/40 181/208 |
| 5,958,556 | A * | 9/1999 | McCutcheon | H05K 1/0271 174/161 R |
| 7,788,826 | B2 * | 9/2010 | Frederick | A43B 13/189 36/28 |
| 8,097,194 | B2 * | 1/2012 | Boss | B32B 25/08 264/140 |
| 9,511,571 | B2 * | 12/2016 | Montgomery | B29C 70/08 |
| 2005/0281137 | A1 | 12/2005 | Bourgeois et al. | |
| 2006/0187767 | A1 | 8/2006 | Conus et al. | |
| 2007/0094950 | A1 * | 5/2007 | Surace | B32B 7/12 52/144 |
| 2009/0207700 | A1 | 8/2009 | Genequand | |
| 2011/0019506 | A1 | 1/2011 | Dehon | |
| 2011/0019508 | A1 | 1/2011 | Behling et al. | |
| 2012/0279800 | A1 * | 11/2012 | Guyader | B32B 15/04 181/294 |

FOREIGN PATENT DOCUMENTS

| | | | |
|---|---|---|---|
| EP | 1 422 436 A1 | 5/2004 | |
| EP | 1 696 286 A1 | 8/2006 | |
| EP | 1 736 838 A1 | 12/2006 | |
| EP | 1 975 749 A2 | 10/2008 | |
| EP | 2 090 941 A1 | 8/2009 | |
| EP | 2 105 806 A1 | 9/2009 | |
| EP | 2 629 160 A2 | 8/2013 | |
| FR | 3002997 | * | 9/2014 |

OTHER PUBLICATIONS

Fr3002997 Machine translation, retrieved from the Internet May 29, 2018.*

* cited by examiner

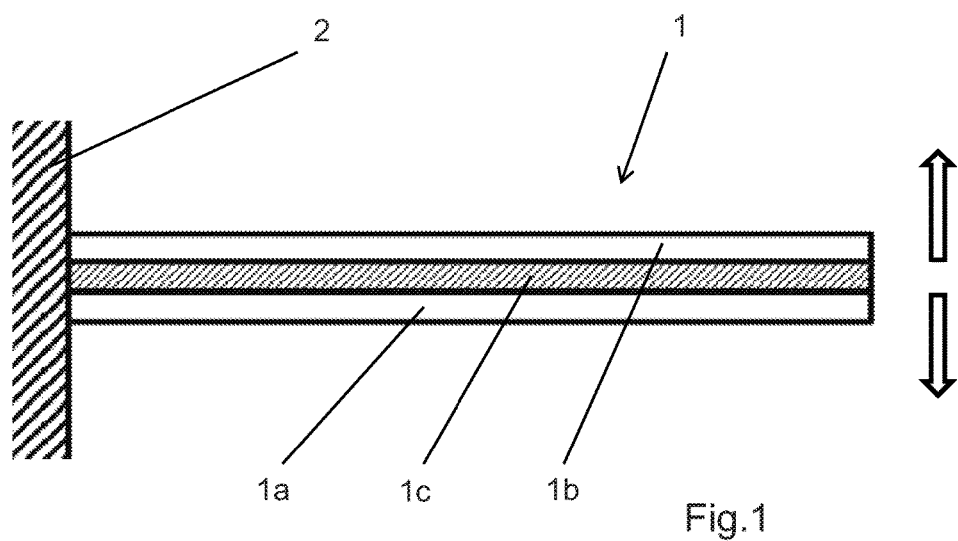
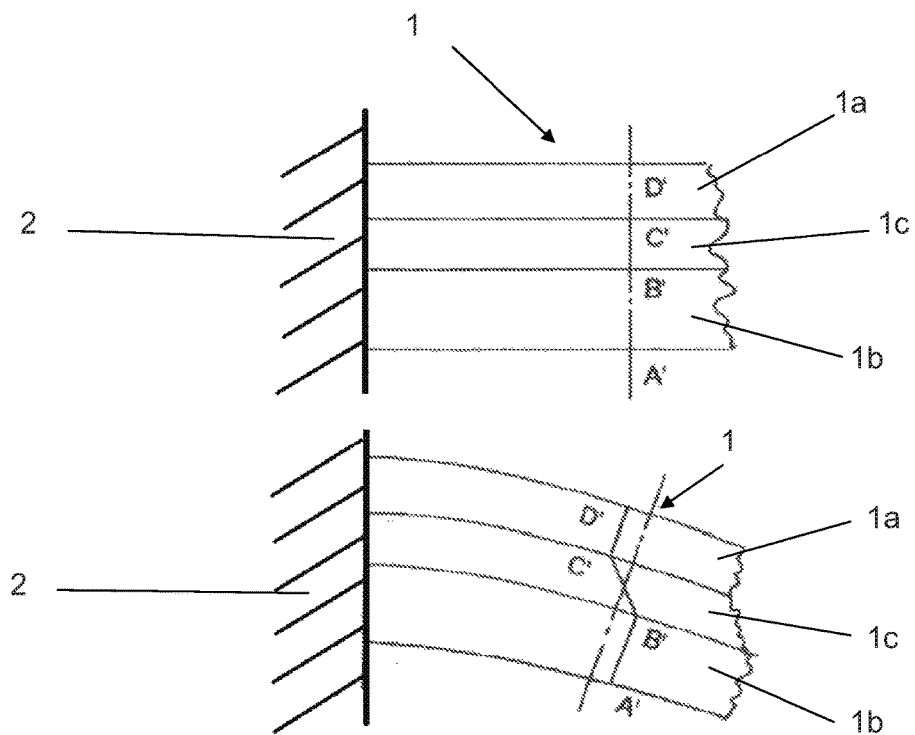
Fig.2

SHOCK-ABSORBER DEVICE, IN PARTICULAR FOR A MICROMECHANICAL CLOCKWORK COMPONENT

FIELD OF THE DISCLOSURE

The present disclosure relates to the microtechnical field, and more particularly that of clockwork. The present disclosure relates to a shock-absorber device and/or vibration-absorber device for a micromechanical component, and more particularly for a micromechanical clockwork component such as a shock-resistant clamp fastening the movement to the case of a watch or a shock-resistant banking attached at the virtual pivot of a flexible guidance system, in particular.

BACKGROUND

In the field of high precision micromechanics, and that of clockwork in particular, it is well known to use so-called shock-resistant devices to protect components, for example, those of a watch. Such devices, for example, consist of shock-resistant bearings or shock-resistant clamps as described in documents CH 700,496; EP 1,696,286; EP 2,629,160; EP 1,975,749; or CH 701,549, for example.

Documents CH 700,496 describes a shock-resistant bearing for a clockwork part comprising a body, a bearing mounted in the body and having a hole able to receive a pivot, elastic means acting axially on the bearing and guide means for forcing the bearing to move only axially against the axial action exerted by the elastic means during a radial movement of the pivot. Said guidance and elastic means consist of pre-stressed elastic blades. These blades are more rigid radially than axially, such that the bearing moves almost entirely axially, even upon radial shocks.

Although this type of device makes it possible to protect the pivot from shocks, it does not absorb the kinetic energy from the shock, such that said energy is transmitted to the rest of the movement, which may be damaged.

Document EP 1,696,286 describes a shock-resistance bearing for a timepiece, and more particularly for a pivot-shank of a staff of a wheel of a timepiece, comprising a support block designed to be driven, fixed or formed in the frame of said timepiece, said support block being provided with a housing provided to receive a setting supporting a pierced stone crossed through by the pivot-shank and an end-stone. The setting is kept in the housing using a spring with axial and radial deformation that is formed by a rigid peripheral ring forcibly mounted against the wall of the housing while bearing on a bead situated at the bottom of the housing so as to arrange a space allowing a certain axial travel of the spring, a substantially annular rigid central support and elastic means connecting said peripheral ring to said central support. Secondarily, the space between the arms of the spring can be filled with a "shock-absorber" substance, such as a polymer, for example.

This type of shock-absorber bearing, although acting elastically both in-plane and outside the plane without requiring an intermediate part, has the drawback of only having an elastic response to a shock. Thus, the kinetic energy of the shock is not absorbed and can spread to the rest of the movement, at the risk of damaging it. It will be noted that in the alternative embodiment in which the space between the arms of the spring is filled with a shock-absorbing polymer, there is no free space for the blades to be able to bend and the radial shocks are therefore not absorbed, yet the radial shocks are much more frequent than out-of-plane shocks.

Document EP 2,629,160 describes a shock-absorber including a lateral buffer element positioned between a bracelet watch case and a watch module, in which the lateral buffer element comprises a plurality of buffer layers respectively having different transmissibilities of the vibrations for predetermined frequencies. Thus, when the bracelet watch case is subject to vibrations due to external shocks, the different buffer layers of the lateral buffer element attenuate and absorb the low-frequency and high-frequency vibrations, respectively.

Document EP 1,975,749 describes a timepiece whereof the movement is held elastically. Said timepiece comprises a case, a movement, an elastic shock-absorber organ holding the movement inside the case and a manual control organ crossing through a wall of the case and connected to the movement, said timepiece further comprising a rigid tube crossing through said wall, in which tube the manual control organ is engaged, and an elastic shock-absorber sleeve interposed between the tube and said wall. The elastic shock-absorber sleeve is formed in a single piece with the elastic shock-absorber organ that surrounds the movement, the latter being made from rubber.

These two types of device have the drawback of not keeping the movement in place precisely in the case, not procuring correct repositioning of the movement after the shock and not protecting the movement against axial shocks.

Document CH 701,549 describes an anti-shock watch including shock absorbers to mount the watch movement inside the case. Each shock absorber includes a plurality of independent portions suitable for absorbing the energy of the shocks and vibrations in different portions of the frequency spectrum, a first shock-absorber portion being made from metal and another portion of the same shock absorber being made from a softer material, such as a synthetic, rubber, colloid or gel material, for example.

Although this type of device makes it possible to filter both low and high frequencies, and to allow repositioning of the movement using flanges, it nevertheless has the drawback of being particularly cumbersome.

Yet the latest technological advances in the field of high precision micromechanics, and more particularly the field of timepieces, increasingly frequently use silicon, which, although having many advantages, such as showing no fatigue, being nonmagnetic, or allowing the serial production of parts with high precision while offering a high design freedom, nevertheless still has the drawback of being fragile and breaking, such that it does not withstand accidental shocks very well. Such silicon timepieces are in particular described in documents EP 1,422,436; EP 2,105,806; and EP 1,736,838.

Document EP 1,422,436 describes a balance-spring designed to equip the balance of a mechanical timepiece and provided with a spiral bar obtained from monocrystalline silicon.

Document EP 2,105,806 describes an escapement mechanism arranged to transmit pulses of mechanical energy from a motor source to an oscillating regulator of a timepiece by means of a strip-spring working by buckling around an inflection point, said strip-spring being able to accumulate the energy from the motor source between two pulses and transmit it to the oscillating regulator upon each pulse by levers. The strip-spring is mounted on a chassis and said strip-spring and/or said chassis is made from silicon, with or without being in a single piece.

Document EP 1,736,838 describes a mechanical oscillator including a system of flexible articulations mounted around a virtual pivot, capable of significantly increasing the power reserve of the watch.

The shock absorbers of the prior art are not suitable for this type of system, yet they are particularly sensitive to shocks and/or vibrations, even more so given that this type of system is usually manufactured from silicon.

There is therefore a need for an anti-shock device able to absorb shocks and/or vibrations in all directions, and more particularly the radial and axial directions, to dissipate all or part of the kinetic energy caused by the shocks and to be integrated into different locations of a timepiece, in order to avoid any deterioration of the parts of the watch, and more particularly the parts made from silicon, which is fragile and breakable, such as flexible guide mechanisms, for example.

SUMMARY OF THE DISCLOSURE

One of the aims of various embodiments of the present disclosure is therefore to resolve these drawbacks by providing a shock-absorber device for a micromechanical component able to absorb axial and/or radial shocks and/or vibrations while dissipating all or part of the kinetic energy caused by said shocks and/or vibrations.

Another aim of various embodiments of the present disclosure is to provide a shock-absorber device and a method for manufacturing such a shock-absorber device with a simple and inexpensive design.

To that end and according to an aspect of the present disclosure, a shock-absorber and/or vibration-absorber device is proposed comprising at least one flexible element able to deform under the effect of a stress; said device is remarkable in that it includes at least one so-called dissipative layer made from a material having a shear modulus lower than the shear modulus of the flexible element, a shock-absorbing factor greater than the shock-absorbing factor of said flexible element, and at least partially secured to said flexible element such that a flexion of the flexible element, under the effect of the stress, provides shearing of the dissipative layer making it possible to dissipate at least part of the energy from said stress.

It will be understood that the elasticity of the flexible element(s) exerts a greater return force when the movement is more significant, resulting in oscillations around the initial position. The energy dissipation by shearing of the dissipative layer makes it possible to damp the oscillations and quickly return the flexible element(s) to their original position.

In some embodiments, the flexible element(s), as well as the dissipative layer, are designed such that the return of the shock-absorber device to its initial idle position is perfect, i.e., there is no plastic deformation.

In some embodiments, the shock absorbing device includes at least two flexible elements and at least one dissipative layer extending between said flexible elements, said dissipative layer being secured at least partially with each of the flexible elements. Such a construction makes it possible to procure greater shearing of the dissipative layer, and therefore faster shock absorption.

In general, the device may include n flexible elements extending substantially parallel to one another and n−1 dissipative elements extending between two consecutive flexible elements, each dissipative element being secured at least partially to said two consecutive flexible elements, and wherein n is an integer greater than or equal to 3.

Each dissipative layer is obtained from at least one viscoelastic material and has a shear modulus at least 10 times lower than the shear modulus of the flexible element(s).

According to one alternative embodiment, each dissipative layer is made up of a stack of at least two layers obtained from at least two different viscoelastic materials.

According to another alternative embodiment, each dissipative layer is made up of at least two segments respectively obtained from a viscoelastic material.

In some embodiments, each dissipative layer has a shock absorbing factor at least 5 times greater than the shock-absorbing factor of the flexible element(s).

Furthermore, each dissipative layer is obtained from a polymer and, in some embodiments, an elastomer chosen from the list comprising polyurethanes, cis-1,4-polyisoprene (NR), synthetic polyisoprene (IR), polybutadiene (BR), styrene-butadiene copolymer (SBR), polyisoprenes, polyisobutylenes, butadiene-acrylonitrile copolymers, ethylene-propylene copolymers, ethylene-propylene-diene terpolymers, polyether block amide (PEBA), elastomeric polyolefins such as polyisobutylene (PM), ethylene-propylene (EPR or EPM) and ethylene-propylene-diene-monomer (EPDM), ethylene-vinyl acetate copolymer (EVA or EVM), ethylene acrylic copolymer (AEM), polyacrylic elastomers (ACM), epichlorhydrin elastomers (CO and ECO), or any combination thereof.

Furthermore, the flexible element(s) are made from a metal, a ceramic metal or a crystal such as silicon, which has many advantages, such as not having any fatigue, being nonmagnetic, not having a plastic range, or allowing the serial manufacture of parts with high precision while offering great design freedom.

The flexible element(s) are rectilinear or curved.

Said curved flexible elements have a constant curve radius, two adjacent curved flexible elements having a different curve radius and a same curve center.

According to one alternative embodiment, each flexible element includes a rectilinear central part and two rectilinear distal parts extending substantially perpendicular to the central part and extending from the end of said central part on either side of the latter, respectively.

Furthermore, the flexible element(s) have a length at least 3 to 100 times greater than the thickness of said flexible elements in some embodiments and, in other embodiments, have a length at least 5 to 30 times greater than the thickness of said flexible elements.

In some embodiments, the flexible element(s) have a length comprised between 0.1 and 10 mm.

In some embodiments, the thickness of the dissipative layer is comprised between 10 μm and 2 mm, and more preferably between 10 μm and 1 mm.

Furthermore, the weight of the shock-absorber device according to an aspect of the present disclosure is comprised between 0.01 g and 50 g.

According to one embodiment of the device, the flexible element consists of a blade. In another embodiment, the flexible element comprises a blade.

According to another alternative embodiment, the shock-absorber device includes a plurality of shock-absorber assemblies respectively made from at least one flexible element and at least one dissipative layer, said shock-absorber assemblies being separated by an empty space.

Another aim of various embodiments of the present disclosure relates to an anti-shock and/or anti-vibration clamp for a timepiece that comprises at least one case and a movement extending inside said case, said anti-shock clamp holding the movement inside the case; said anti-shock clamp is remarkable in that it is made up of a shock-absorber device comprising at least two flexible elements extending substantially parallel and at least one dissipative layer extending between said flexible elements, said dissipative layer being at least partially secured to each of the flexible elements, and in that each flexible element includes a rectilinear central part and two rectilinear distal parts extending substantially perpendicular to the central part and extending from the ends of said central part on either side of the latter, respectively, the free end of a first distal part being secured to the case and the free end of the second distal part being secured to the movement.

Another aim of various embodiments of the present disclosure relates to an anti-shock and/or anti-vibration banking for a timepiece; said banking is remarkable in that it is made up of a central crown from which three shock-absorber devices extend, uniformly distributed around the crown, each shock-absorber device being made up of at least two curved flexible blades with different lengths and curve radii and a dissipative layer extending between said curved flexible blades.

In some embodiments, the free end of each shock-absorber device ends with a radial protuberance comprising a recess filled with viscoelastic material forming the dissipative layer, said radial protuberance being secured to the outer flexible blade of an adjacent shock-absorber device.

Another aim of various embodiments of the present disclosure relates to a method for manufacturing a shock-absorber and/or vibration-absorber device; said method includes at least the following steps for forming at least one flexible element and securing at least one dissipative layer over all or part of said flexible element, said dissipative layer having a shear modulus lower than the shear modulus of the flexible element and a shock-absorbing factor greater than the shock-absorbing factor of said flexible element.

Said step for forming the flexible element can either consist of, consist essentially of, or comprise depositing a mask on a silicon wafer, and etching said wafer.

Said mask is deposited on the wafer, then structured by photolithography or by electron beam lithography.

Furthermore, said etching can either consist of, consist essentially of, or comprise chemical etching or reactive ion etching or plasma etching.

In some embodiments, the method can either consist of, consist essentially of, or comprise forming two parallel flexible elements from a silicon wafer, then depositing, between said flexible elements, a polymerizable material in liquid form having, after polymerization, a shear modulus lower than the shear modulus of the silicon and a shock-absorbing factor greater than the shock-absorbing factor of the silicon, then polymerizing said polymerizable material.

Advantageously, the method can either consist of, consist essentially of, or comprise forming two parallel flexible blades and a recess forming a reservoir, said recess emerging between the two flexible elements, from a silicon wafer, then depositing, in the recess, a polymerizable material in liquid form having, after polymerization, a shear modulus lower than the shear modulus of the silicon and a shock-absorbing factor greater than the shock-absorbing factor of the silicon, then, after said polymerizable material has spread by capillarity in all of the space separating the two flexible elements, polymerizing said polymerizable material.

Said polymerizable material can either consist of, consist essentially of, or comprise a photosensitive polymer and the polymerization step can either consist of, consist essentially of, or comprise exposing said polymerizable material to ultraviolet radiation.

In some embodiments, said polymerizable material can either consist of, consist essentially of, or comprise of photosensitive polyurethane.

According to one alternative embodiment, the method can be polymerized by heat or other thermal means.

In general and in some embodiments, the method for manufacturing a shock-absorber device according to an aspect of the present disclosure includes the following steps:
a. forming at least two flexible elements as well as a recess forming a reservoir, said recess emerging between the two flexible elements,
b. depositing, in said recess, a polymerizable material in liquid form having, after polymerization, a shear modulus lower than the shear modulus of the flexible elements and a shock-absorbing factor greater than the shock-absorbing factor of the flexible elements,
c. after said polymerizable material has spread by capillarity in at least part of the space separating the two flexible elements, polymerizing said polymerizable material.

Furthermore, in some embodiments, said flexible elements extend substantially parallel and are made, for example, from silicon. Furthermore, in some embodiments, the polymerizable material spreads in the entire recess and the space separating the two flexible elements.

DESCRIPTION OF THE DRAWINGS

Other details of the disclosed subject matter will appear more clearly upon reading the following description, done in reference to the appended drawings, in which:

FIG. 1 is a diagrammatic longitudinal sectional illustration of one representative embodiment of a shock-absorber device for a micromechanical clockwork component according to an aspect of the present disclosure;

FIG. 2 is a partial diagrammatic longitudinal sectional illustration of deformations of the shock-absorber device for a clockwork micromechanical component shown, for example, in FIG. 1;

DETAILED DESCRIPTION

Figure 3:
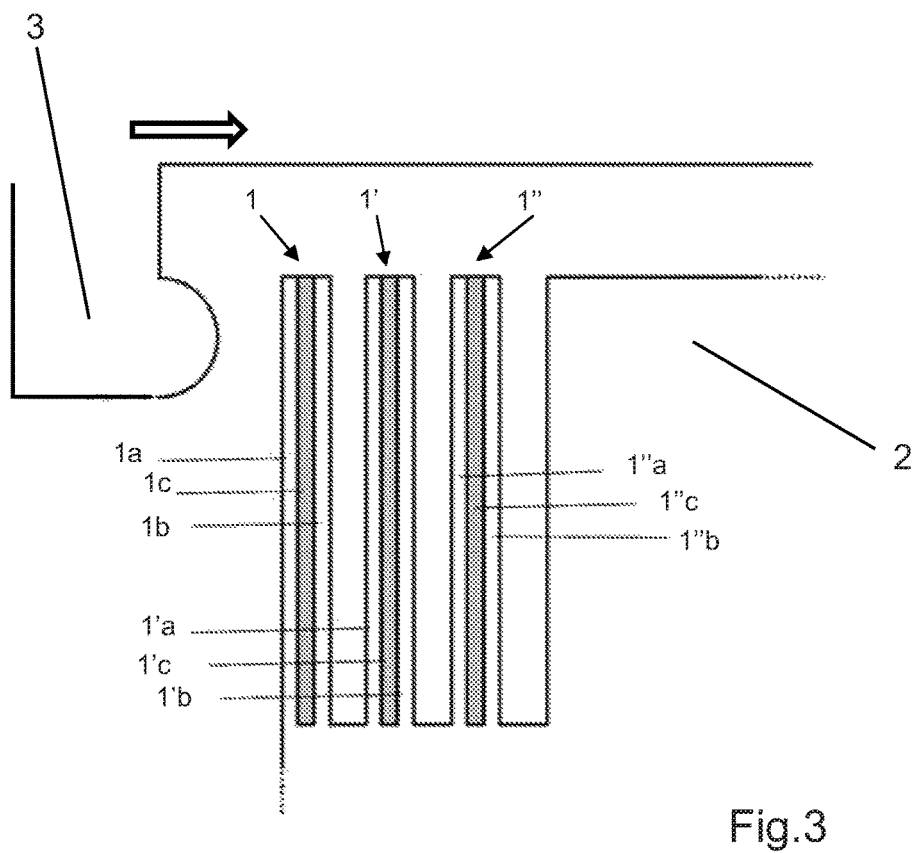
FIG. 3 is a diagrammatic sectional illustration of a first alternative embodiment of the shock-absorber device for a micromechanical clockwork component.

Below, we will describe examples of a shock-absorber and/or vibration-absorber device for timepieces that is particularly suitable for an anti-shock clamp, said anti-shock clamp holding the movement inside the case, and for an anti-shock banking for a timepiece comprising a flexible guiding system including a virtual pivot; however, the shock-absorber device according to the present disclosure may of course be suitable for damping the shocks and/or vibrations between two parts of a timepiece such as a clockwork oscillator, a clockwork movement or the like, or between two parts of any micromechanical component without going beyond the scope of the claimed subject matter. Said shock-absorber device may thus be integrated both on the internal components of the movement and components outside the movement. It may be arranged directly on a part to be protected, around the part, on an outside element that may damage it, or serve as a fastener.

In reference to FIG. 1, which is a diagrammatic illustration of one representative embodiment of a shock-absorber device for timepieces, said shock-absorber device 1 is made up of two rectilinear flexible blades 1a and 1b, extending substantially parallel one above the other, and a so-called dissipative layer 1c extending between said flexible blades 1a and 1b and being secured, over all or part of its length, to said flexible blades 1a and 1b. The dissipative layer 1c is secured to the flexible blades 1a and 1b by any appropriate means such as by gluing, adding material, etc., the adhesion force of the dissipative layer 1c with the flexible blades 1a and 1b having to be sufficient to avoid delamination when a stress is applied on the shock-absorber device.

In this particular example embodiment, the flexible blades 1a and 1b as well as the dissipative layer 1c have a rectangular cross-section; however, it is obvious that the flexible blades 1a and 1b as well as the dissipative layer 1c could have a cross-section of any shape without going beyond the scope of the claimed subject matter.

The flexible blades 1a and 1b are made from an elastic material so that the repositioning of the shock-absorber device in its initial rest position is perfect, i.e., there is no plastic deformation. Thus, the flexible blades 1a and 1b are obtained from any material having a high Young's modulus, i.e., a Young's modulus greater than or equal to 50 GPa chosen from among metals, ceramics or crystals, such as silicon. Silicon has the advantages of having no fatigue, being nonmagnetic, and allowing the serial manufacture of parts with high precision while offering great design freedom.

The dissipative layer 1c is obtained from a viscoelastic material having a low shear modulus, i.e., a shear modulus preferably below 10 GPa, a loss factor of at least 0.1, and preferably made from a polymer. Preferably, the dissipative layer 1c has a shear modulus at least 10 times lower than the shear modulus of the flexible blade(s) 1a and 1b. Said polymer preferably consists of, consists essentially of, or comprises an elastomer chosen from the list comprising polyurethanes, cis-1,4-polyisoprene (NR), synthetic polyisoprene (IR), polybutadiene (BR), styrene-butadiene copolymer (SBR), polyisoprenes, polyisobutylenes, butadiene-acrylonitrile copolymers, ethylene-propylene copolymers, ethylene-propylene-diene terpolymers, polyether block amide (PEBA), elastomeric polyolefins such as polyisobutylene (PIB), ethylene-propylene (EPR or EPM) and ethylene-propylene-diene-monomer (EPDM), ethylene-vinyl acetate copolymer (EVA or EVM), ethylene acrylic copolymer (AEM), polyacrylic elastomers (ACM), epichlorhydrin elastomers (CO and ECO), or any combination thereof.

Furthermore, the flexible blades 1a, 1b have a length at least 3 to 100 times greater than the thickness of the flexible blades 1a, 1b, and in some embodiments, a length at least 5 to 30 times greater than the thickness of the flexible blades 1a, 1b, said length of the flexible blades 1a and 1b, and in fine of the dissipative layer 1c, is comprised between 0.1 and 10 mm.

In some embodiments, the thickness of the dissipative layer is comprised between 10 μm and 2 mm, and more preferably between 10 μm and 1 mm, and the weight of the shock-absorber device is comprised between 0.01 g and 50 g.

Obviously, the dissipative layer 1c could be obtained for a plurality of viscoelastic materials and/or the viscoelastic material could include any filler to modify its behavior. Thus, the dissipative layer 1c may be made from a stack of at least two layers obtained from at least two different viscoelastic materials or be made from at least two segments respectively obtained from a viscoelastic material. It will be noted that such a construction makes it possible to adapt the impedance of the shock-absorber and/or vibration-absorber device based on its intended application.

Preferably, the dissipative layer 1c has a shock-absorbing factor at least 5 times greater than the shock-absorbing factor of the flexible blades 1a, 1b.

According to one alternative embodiment not shown in the figures, the shock-absorber device may include n flexible blades 1a, 1b, etc. extending substantially parallel to one another and n−1 dissipative layers 1c, etc. extending between two consecutive flexible blades 1a, 1b, each dissipative layer 1c being at least partially secured to said two consecutive flexible blades 1a, 1b, and wherein n is an integer greater than or equal to 3.

Furthermore, it is clear that the flexible blades 1a, 1b could be replaced by any flexible element with any shape, such as a flexible element in tubular form, for example, without going beyond the scope of the claimed subject matter.

Furthermore, the flexible blades 1a, 1b, etc. could be curved and non-rectilinear, as previously described. In this case, the curved flexible blades 1a, 1b have a constant curve radius, two adjacent curved flexible blades 1a, 1b having a different curve radius and a same curve center.

We will now explain the operation of the shock-absorber device in reference to FIGS. 1 and 2.

In reference to FIG. 1, the shock-absorber device is secured, for example by embedding, to a clockwork component 2. When a force is applied in the vertical direction of the plane of FIG. 1 at the end of the flexible blades 1a and 1b, the flexible blades 1a and 1b bend while storing energy in elastic form essentially by the deformation of said flexible blades 1a, 1b as shown in FIG. 2. During the bending of the flexible blades 1a and 1b, the opposite points B' and C' of the two flexible blades 1a, 1b move relative to one another such that the dissipative layer 1c is subject to a shear force between the two flexible blades 1a, 1b. The deformation of the viscoelastic dissipative layer 1c resulting therefrom dissipates the energy in the form of heat.

The elasticity of the flexible blades 1a and 1b exerts an even greater return force when the movement is significant, resulting in oscillations around the initial position. The dissipation of energy by shearing of the dissipative layer 1c makes it possible to adapt the oscillations and quickly return the flexible blades 1a and 1b to their original position.

Preferably, the flexible blades 1a and 1b are sized such that the inherent frequency of the sandwich structure is close to the main frequency of the shocks and/or vibrations to be absorbed. Thus, the deformation of the flexible blades 1a and 1b is maximal, which causes a greater shearing of the dissipative layer 1c and faster damping of the oscillations.

It will be noted that the energy of a shock is essentially dissipated by shearing of dissipative layer 1c, which is more effective than dissipation by traction or compression. Indeed, for a given force, the movement of a thin layer is greater in shear than in compression, which leads to greater hysteresis and greater energy dissipation.

Furthermore, one skilled in the art will not have difficulties in appropriately sizing the flexible blades 1a and 1b as well as the dissipative layer based on the frequency of the shock and/or vibrations to be absorbed, the inherent frequency of the shock-absorber device having to be close to the main frequency of the shock and/or vibrations to be absorbed. Indeed, it is well known by those skilled in the art that the inherent frequency of the shock absorber device in particular depends on the material and geometry of the flexible blades $1a$, $1b$ and the dissipative layer $1c$, i.e., the Young's modulus of the different materials making up the shock-absorber device, the shock-absorbing factor and the quadratic moment of the section.

Furthermore, it will be observed that embodiments of the shock-absorber device have a bulk substantially equivalent to that of a homogenous flexible blade. Indeed, the replacement of elastic material with viscoelastic material between two flexible blades has only a small influence on the quadratic moment of the shock-absorber device. As a result, the shock-absorber device and a solid flexible blade with the same moment of inertia have substantially the same bulk, and it is consequently easy to be able to replace the anti-shock devices of the prior art with embodiments of the shock-absorber devices described herein. In fact, the fastening clamps, for example, can be replaced by the clamps without modifying the case or movement of the watch, the clamps described herein having a very small bulk.

According to a second alternative embodiment of the shock-absorber device, in reference to FIG. 3, the shock-absorber device 1 is made up of a plurality of shock-absorber assemblies $1'$, $1''$ and $1'$ respectively formed by two flexible blades $1a$, $1b$; $1'a$, $1'b$; $1''a$, $1''b$ extending substantially parallel and a dissipative layer $1c$, $1'c$, $1''c$. These shock-absorber assemblies 1, $1'$ and $1''$ are secured to a first fixed clockwork component 2, near one of its ends, and extend vertically in this example embodiment. A second moving clockwork component 3, shown in its rest position, is able to move relative to the first component 2 following a shock in the horizontal direction of FIG. 3. By moving, the second component 3 abuts against the first flexible blade $1a$ of the shock-absorbing assembly, which deforms while absorbing and dissipating the energy of the shock. Based on the intensity of the shock, a variable number of shock-absorber assemblies 1, $1'$, $1''$ is biased, which makes it possible to obtain a banking whereof the stiffness increases with the intensity of the shock.

It will be noted that the spaces separating the different shock-absorbing assemblies 1, $1'$ and $1''$ make it possible to obtain an energy dissipation not only by shearing of the dissipative layers $1c$, $1'c$, $1''c$, but also by dry friction between the flexible blades $1b$ and $1'a$ and optionally $1'b$ and $1''a$. Indeed, for a greater shock, the shock-absorbing assembly 1 bears on the second shock-absorbing assembly $1'$ while rubbing on the latter, the second shock-absorber $1''$ also being able to bear on the third shock-absorber assembly $1''$ and dissipate part of the energy by friction.

Of course, the length and thickness of the flexible blades and the dissipative layer, the space separating two consecutive shock-absorbing assemblies, and the number of consecutive shock-absorber assemblies are determined as a function of the intensity of the shocks and the frequencies to be absorbed, one skilled in the art not having any difficulties in determining these elements.

Of course, the second clockwork component 3 may include a balance, pallets, a train, or any other moving element present in the movement of a watch, and the shock-absorber assemblies 1, $1'$, $1''$ can be secured to the second moving clockwork component 3 and/or the first fixed clockwork component 2 without going beyond the scope of the claimed subject matter. Furthermore, embodiments of the shock-absorber device may of course comprise any number of shock-absorber assemblies 1, $1'$, $1''$.

Figure 4:
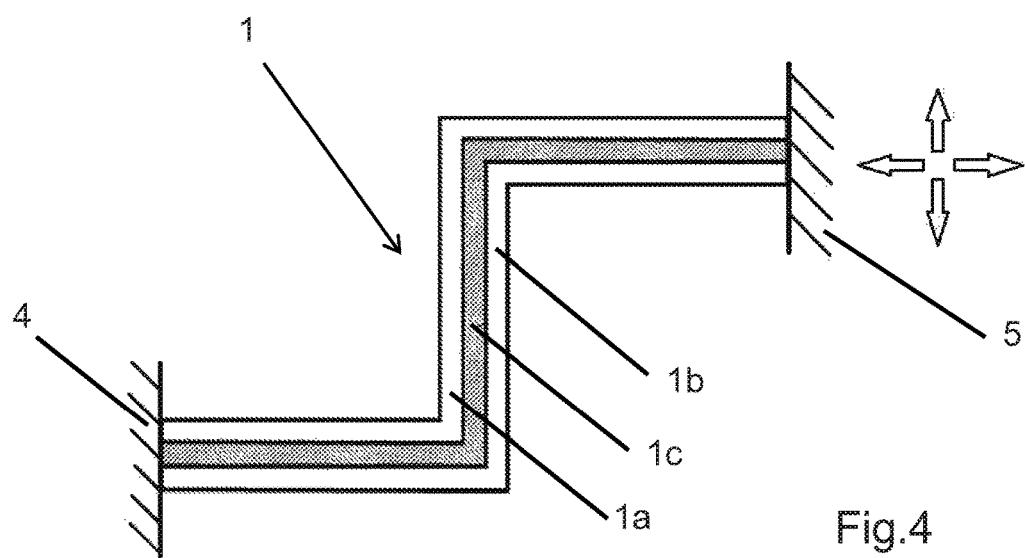
FIG. 4 is a diagrammatic sectional illustration of a second alternative embodiment of the shock-absorber device for a micromechanical clockwork component.

According to a third alternative embodiment of the shock-absorber device, in reference to FIG. 4, the latter includes an anti-shock clamp for a timepiece that comprises at least one case 4 and a movement 5 extending inside said case 4, said case 4 and said movement 5 only being shown diagrammatically. Said anti-shock clamp is made up of a shock-absorber device 1, as previously described, comprising at least two flexible blades $1a$ and $1b$ extending substantially parallel and at least one dissipative layer $1c$ extending between said flexible blades $1a$ and $1b$, said dissipative layer $1c$ being secured at least partially to each of the flexible blades $1a$ and $1b$. Each flexible blade $1a$ and $1b$, and in fine the dissipative layer $1c$, includes a rectilinear central part and two rectilinear distal parts extending substantially perpendicular to the central part and extending from the end of said central part on either side of the latter, respectively, the free end of a first distal part being secured to the case 4 and the free end of the second distal part being secured to the movement 5.

In this particular example embodiment, the flexible blades $1a$ and $1b$ are made from stainless steel and the dissipative layer $1c$ is for example made from acrylic adhesive, polyurethane or epoxy resin adhering to the flexible blades $1a$ and $1b$.

Thus, the shock-absorber device 1 has an "S" shape so as to be able to deform and damp the shocks in the plane of FIG. 4, i.e., according to any combination of movements in the horizontal and vertical directions of FIG. 4. As in the embodiments previously described, the deformation of the shock-absorber device 1 during the shock causes relative movement of the flexible blades $1a$ and $1b$, which procures shearing of the dissipative layer $1c$ and damping of the oscillations. The flexible blades $1a$, $1b$ return the movement 5 to its initial rest position.

Figure 5:
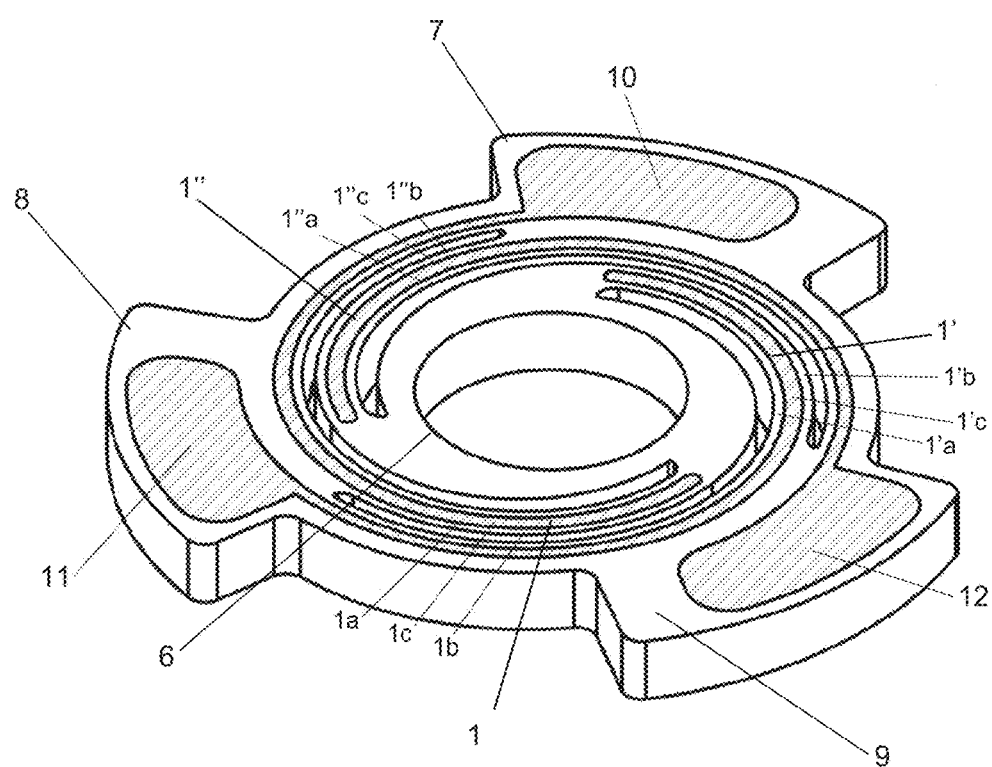
FIG. 5 is a perspective view of a third alternative embodiment of the shock-absorber device for a micromechanical clockwork component.

According to yet another alternative embodiment of the shock-absorber device, in reference to FIG. 5, the latter includes anti-shock banking for a timepiece comprising a flexible guide system including a virtual pivot as described in document EP 2,090,941, for example. The anti-shock banking is made up of a central crown 6 from which three shock-absorber devices 1, $1'$ and $1''$ extend, distributed uniformly around the crown 6, each shock-absorber device 1, $1'$ and $1''$ being made up of at least two curved flexible blades $1a$, $1b$; $1'a$, $1'b$; $1''a$, $1''b$ with different lengths and curve radii, following a spiral pattern, the center of the spiral being combined with the central axis of the crown 6, and the dissipative layer $1c$, $1'c$, $1''c$ extending between said curved flexible blades $1a$, $1b$; $1'a$, $1'b$; $1''a$, $1''b$.

The free end of each shock-absorber device ends with a radial protuberance 7, 8 and 9 comprising a recess 10, 11 and 12, respectively, filled with a viscoelastic material forming the dissipative layer $1c$, $1'c$, $1''c$, said radial protuberance 7, 8 and 9 being secured to the outer flexible blade of an adjacent shock-absorber device 1, $1'$, $1''$.

It will be noted that the two flexible blades $1a$, $1b$; $1'a$, $1'b$; $1''a$, $1''b$ of the shock-absorber assemblies 1, $1'$, $1''$ have different curve radii and lengths, said flexible blades $1a$, $1b$; $1'a$, $1'b$; $1''a$, $1''b$ being embedded in the central crown 6 at two points separated from one another. These flexible blades $1a$, $1b$; $1'a$, $1'b$; $1''a$, $1''b$ not having the same length, they do not have the same stiffness, such that, during an out-of-plane movement, their movements are different, procuring a significant shearing for the polymer dissipative layer $1c$. Furthermore, during the in-plane movements, the difference in curvature between the flexible blades $1a$, $1b$; $1'a$, $1'b$, $1''a$, $1''b$ procures shearing of the dissipative layer $1c$. Thus, the shearing of the dissipative layer $1c$ is ensured, for the out-of-plane movements, by the difference in length of the flexible blades 1a, 1b; 1'a, 1'b; 1"a, 1"b and, for the in-plane movements, by their difference in curve radius. For the same reasons, the rotations around the radial axis are also damped, while the rotations around the main axis are not slowed, thus not affecting the normal operation of the pivot. Consequently, the kinetic energy of a shock is therefore advantageously dissipated in all parasitic directions.

This arrangement of the shock-absorber device 1 in a spiral around a central crown advantageously distributes the deformations and thus limits the stress concentrations. Furthermore, in this particular example embodiment, the anti-shock banking includes three shock-absorber devices so as to maximize the angular and radial distance between the embedding points of the flexible blades 1a, 1b; 1'a, 1'b; 1"a, 1"b, while guaranteeing an isostatism without plane of symmetry for the system; however, the anti-shock banking may of course include any number of shock-absorber devices 1, 1', 1" without going beyond the scope of the claimed subject matter.

Advantageously, the manufacturing method for the anti-shock banking according to one embodiment of the present disclosure can either consist of, consist essentially of, or comprise on the one hand of forming a central crown 6 and three pairs of parallel curved flexible blades 1a, 1b; 1'a, 1'b; 1"a, 1"b and a recess 7, 8, 9 forming a reservoir, each recess 7, 8, 9 emerging between the two flexible blades 1a, 1b; 1'a, 1'b; 1"a, 1"b, from a silicon wafer, then depositing, in the recess, a polymerizable material in liquid form having, after polymerization, a shear modulus lower than the shear modulus of the silicon and a shock-absorbing factor greater than the shock-absorbing factor of the silicon, then, after said polymerizable material has spread by capillarity in the entire space separating the two flexible blades 1a, 1b; 1'a, 1'b; 1"a, 1"b, polymerizing said polymerizable material. Said polymerizable material consists of, consists essentially of, or comprises a photosensitive polymer, and in some embodiments, photosensitive polyurethane, and the polymerization step consists of, consists essentially of, or comprises exposing said polymerizable material to ultraviolet radiation. Such a manufacturing method makes it possible to procure optimal adherence between the flexible blades 1a, 1b; 1'a, 1'b; 1"a, 1"b and the dissipative layer 1c.

It will be noted that the photosensitive polymer may be replaced by a heat-sensitive polymer, such as polyethylene, for example, without going beyond the scope of the claimed subject matter.

In general and in some embodiments, a method for manufacturing a shock-absorber device includes the following steps:

a. forming at least two flexible elements as well as a recess forming a reservoir, said recess emerging between the two flexible elements, b. depositing, in said recess, a polymerizable material in liquid form having, after polymerization, a shear modulus lower than the shear modulus of the flexible elements and a shock-absorbing factor greater than the shock-absorbing factor of the flexible elements (1a, 1b), c. after said polymerizable material has spread by capillarity in at least part of the space separating the two flexible elements (1a, 1b), polymerizing said polymerizable material.

Furthermore, in some embodiments, said flexible elements extend substantially parallel and are obtained from silicon, for example from a silicon wafer. Furthermore, in some embodiments, the polymerizable material spreads in the entire recess and the space separating the two flexible elements.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A shock-absorber and/or vibration-absorber device for cooperating with at least two micromechanical clockwork components, comprising:
   a shock-absorber assembly extending between a first end and a second end;
   said shock-absorber assembly comprising at least one flexible blade able to deform under the effect of a stress, said flexible blade being made of a material having a Young's Modulus greater than or equal to 50 GPa; and
   at least one dissipative layer made from a material having a shear modulus lower than the shear modulus of the flexible blade, a shock-absorbing factor greater than the shock-absorbing factor of said flexible blade, and at least partially secured to said flexible blade such that a flexion of the flexible blade, under the effect of a stress, provides shearing of the dissipative layer allowing dissipation of at least part of the energy from said stress;
   said first end of said at least a shock-absorber assembly being configured to cooperate with a first clockwork component;
   second end of said at least a shock-absorber assembly being configured to cooperate with a second clockwork component to absorb the shock when the first clockwork component moves relative to the second clockwork component,
   wherein said device comprises a plurality of shock-absorber assemblies extending from a central crown, each shock-absorber assembly comprising at least two curved flexible blades and at least one dissipative layer extending between said curved flexible blades.

2. The shock-absorber device according to claim 1, including n flexible blades and n−1 dissipative layers extending between two consecutive flexible blades, each dissipative layer being secured at least partially to said two consecutive flexible blades and wherein n is an integer greater than or equal to 3.

3. The shock-absorber device according to claim 1, wherein each dissipative layer is obtained from at least one viscoelastic material.

4. The shock-absorber device according to claim 1, wherein each dissipative layer has a shear modulus at least 10 times lower than the shear modulus of the flexible blade(s).

5. The shock-absorber device according to claim 1, wherein each dissipative layer has a shock-absorbing factor at least 5 times greater than the shock-absorbing factor of the flexible blade(s).

6. The shock-absorber device according to claim 1, wherein the flexible blade(s) and the at least one dissipative layer have a length at least 3 to 100 times greater than the thickness of said flexible blades.

7. The shock-absorber device according to claim 6, wherein the flexible blade(s) and the at least one dissipative layer have a length at least 5 to 30 times greater than the thickness of said flexible blades.

8. The shock-absorber device according to claim 1, wherein the flexible blade(s) have a length comprised between 0.1 and 10 mm.

9. A clockwork oscillator or a clockwork movement comprising the shock-absorber device according to claim 1 so as to protect it from shocks and/or vibrations.

10. The shock-absorber device according to claim 1, wherein the free end of each shock-absorber device ends with a radial protuberance comprising a recess filled with a viscoelastic material forming the dissipative layer, said radial protuberance being secured to the outer flexible blade of an adjacent shock-absorber device.

11. The shock-absorber device according to claim 1, comprising three shock-absorber assemblies, each shock-absorber assembly having different lengths and curve radii.

12. The shock-absorber device according to claim 11, wherein said plurality of shock-absorber assemblies are uniformly distributed around said central crown.

13. The shock-absorber device according to claim 1, wherein the crown is centered with the axis of a virtual pivot.

14. A method for manufacturing a shock-absorber and/or vibration-absorber, the method comprising:
  forming at least one flexible blade from a material having a Young's Modulus greater than or equal to 50 GPa,
  securing at least one dissipative layer over all or part of said flexible blade, said dissipative layer having a shear modulus lower than the shear modulus of the flexible blade and a shock-absorbing factor greater than the shock-absorbing factor of said flexible blade,
  wherein said forming at least one flexible blade includes forming at least two flexible blades as well as a recess forming a reservoir, said recess emerging between the two flexible blades, and wherein the method further comprises:
  depositing, in said recess, a polymerizable material in liquid form having, after polymerization, a shear modulus lower than the shear modulus of the flexible blades and a shock-absorbing factor greater than the shock-absorbing factor of the flexible blades, and
  after said polymerizable material has spread by capillarity in at least part of the space separating the two flexible blades, polymerizing said polymerizable material.

\* \* \* \* \*